United States Patent [19]
Everingham

[11] 3,794,354
[45] Feb. 26, 1974

[54] COUPLING FOR CARAVANS AND TRAILERS

[75] Inventor: Leslie Everingham, New South Wales, Australia

[73] Assignee: Alexander Papp, Tweed Heads, New South Wales, Australia; a part interest

[22] Filed: Aug. 8, 1972

[21] Appl. No.: 278,822

[30] Foreign Application Priority Data
Aug. 10, 1971 Australia.............................. 5850/71

[52] U.S. Cl............................................ 280/478 R
[51] Int. Cl............................................ B60d 1/04
[58] Field of Search................... 280/482, 491, 478

[56] References Cited
UNITED STATES PATENTS
2,444,979  6/1948  Conrad......................... 280/478 RR
1,422,189  7/1922  Eckertz......................... 280/478 AR FOREIGN PATENTS OR APPLICATIONS
661,773  6/1938  Germany......................... 280/478 A
839,387  6/1960  Great Britain................... 280/478 B Primary Examiner—Leo Friaglia
Assistant Examiner—Randall A. Schrecengost
Attorney, Agent, or Firm—Donald D. Jeffery

[57] ABSTRACT

A coupling for a caravan or trailer has a body for mounting on the caravan or trailer tow-bar, and a shaft, with a coupling socket at its front, slidable through the ball of a ball and socket joint in the front of the body, so the shaft may be extended, until stopped by an enlarged rear-end piece, or retracted. The body is shaped so that when the shaft is extended, its coupling socket may be swung to either side or up or down, and when the shaft is retracted the rear-end piece is guided to, and releasably engaged by, a lock.

2 Claims, 3 Drawing Figures

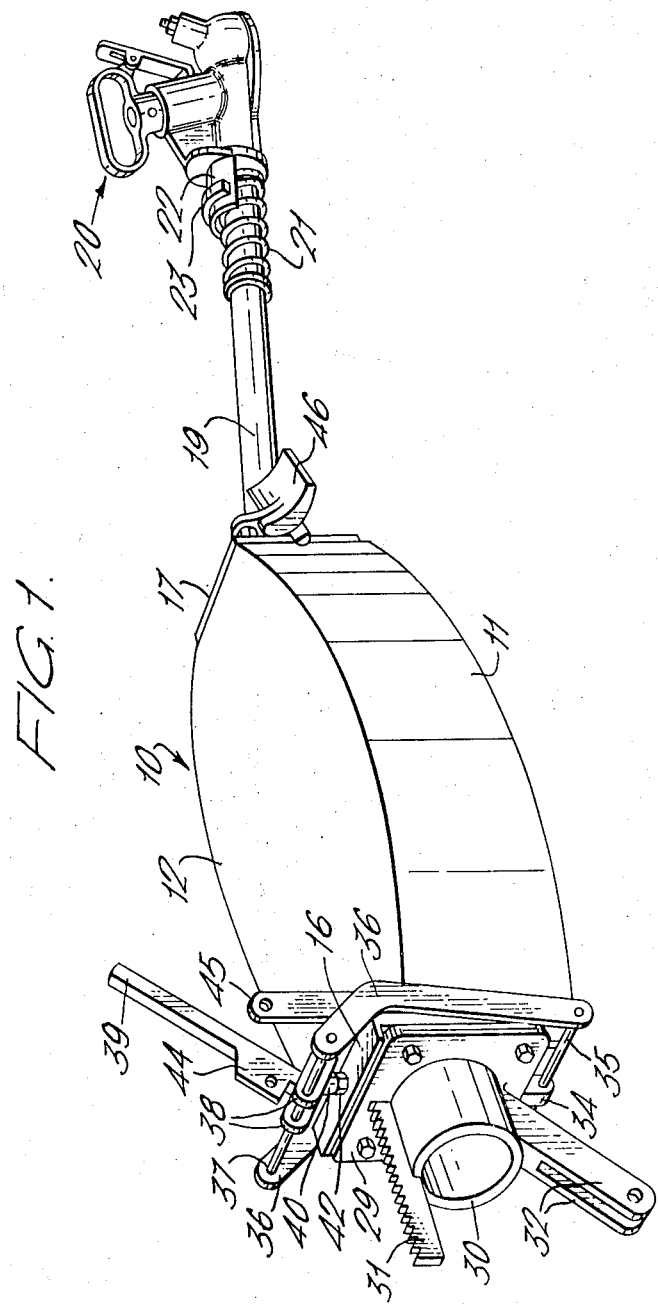

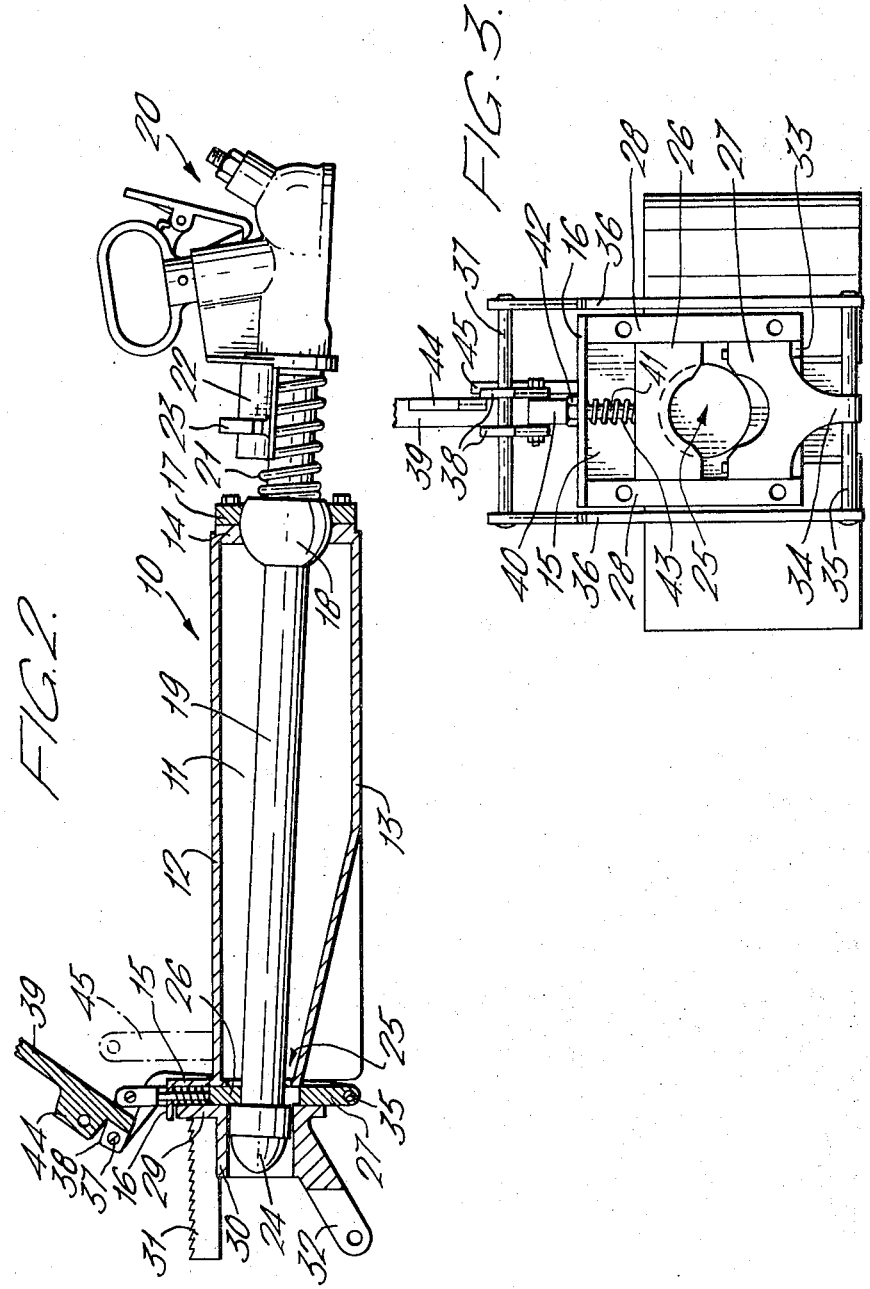

COUPLING FOR CARAVANS AND TRAILERS

This invention relates to an improved coupling for caravans and trailers.

A good deal of difficulty is commonly experienced in coupling a caravan or the like to a car which is to tow it. The car must be backed sufficiently close to the caravan so that the female member or socket of the ball and socket coupling device fitted to the caravan can be easily engaged with the male or ball member of the coupling secured to the tow bar of the car, and to position the car so that the connection can be made without great difficulty is often difficult and time consuming.

The general object of the present invention is to provide a coupling device for use with a caravan, trailer or the like whereby effecting such a connection is very greatly simplified.

According to the invention, a hollow body, which may be welded or otherwise secured on a caravan or trailer drawbar, has at its front a ball oscillatable in a socket and formed with a diametral bearing for a slidable shaft which at its front is provided with a coupling socket of conventional type, for releasable engagement with a coupling ball on the tow bar of a towing vehicle. The shaft, then, may be slidably extended from the housing until an enlarged rear-end piece on the shaft is brought against the oscillatable ball, and the body is so made that when the shaft is fully or partly extended, its front end, with the coupling socket, may be swung to either side, raised and lowered, to facilitate the engagement of the coupling socket with the coupling ball of a towing vehicle. The coupling members being engaged, the towing vehicle may be backed to cause the shaft to be retracted, and guides within the body direct its rear-end piece to a lock at the rear of the body, which automatically engages the rear-end piece, holding the shaft in retracted position. A further safety locking device may be engaged with the rear-end piece of the shaft by means of a handle, and this handle may be used to release both locking means.

In the drawings:

FIG. 1 is a perspective view of a caravan coupling device according to the invention, the coupling shaft in an extended position, FIG. 2 is a longitudinal sectional view of the device, the coupling shaft locked in retracted position, and FIG. 3 is a rear elevational view, to enlarged scale, of the device with the rear end plate removed to show the coupling shaft lock.

The device includes a metal body 10 which is a hollow structure consisting of oppositely bowed sides 11 so the body is widest at the middle and relatively narrow at front and back; a top plate 12; and a bottom plate 13, its front part is parallel to the top plate, its rear part inclining upwardly and rearwardly. The body also has a front plate 14 and a rear plate 15, both perpendicular to the top plate 12, the rear plate 15 extending above the top plate and having a rearwardly extending flange 16 at its upper end.

The body 10 may be fixedly secured, for example by welding, on the front part of the tow-bar assembly of a caravan.

A fore-end plate 17 is bolted to the body front plate 14, and these two plates have registering central holes of spherical zone shape, the two apertures forming a socket for a ball 18. A coupling shaft 19 is slidable through a diametral passage through the ball, and has mounted on its front end a generally conventional coupling socket assembly 20 capable of being releasably locked in engagement with a coupling ball (not shown) mounted behind a towing vehicle. Behind the socket assembly 20, a helical compression spring 21 is fitted about the coupling shaft 19. A curved flange 22, having a rib 23 secured transversely across it, extends rearwardly of the socket assembly 20 to cover part of the spring 21.

On the rear end of the coupling shaft 19 is a rear-end piece 24 consisting of a cylindrical front section coaxial with and of greater diameter than the shaft, and a rear section tapering to a point.

The coupling socket assembly 20 may be drawn forwardly from the body 10 until the rear-end piece 24 is brought to the ball 18, and the assembly when extended may be swung to one side or the other, and raised or lowered. If the socket assembly 20 is pushed rearwardly relative to the body 10, the rear-end piece 24 is guided by the side plates 11 and the top and bottom plates 12 and 13 to bring it to an opening 25 in the rear plate 15, through which the rear-end piece can freely pass, to be automatically engaged by a lock.

The lock, as shown particularly in FIG. 3, includes an upper locking piece 26 and a lower locking piece 27, both vertically slidable against the rear of the end plate 15 and between a pair of upright guides 28. The locking pieces are retained in place between the guides by a rear-end plate 29 bolted to the guides 28, and having a tubular rearwardly extending housing 30 the bore of which is co-axial with and of about the same diameter as the opening 25 through the rear plate 15. Formed integrally with the plate 29 and housing 30 are a rearwardly extending rack arm 31 and a pair of downwardly and rearwardly inclining apertured lugs 32. In known manner, a hand-lever (not shown) for the handbrake of the caravan may be fulcrumed between the apertured lugs 32, being fitted with a pawl releasably engageable with the rack 31, and with a projection which may extend towards the bore of the housing 30.

The upper locking piece 26 is notched from its lower edge, the lower locking piece 27 is notched from its upper edge, so that when the two are brought together the two notches will fit closely about the coupling shaft 19 in front of its rear-end piece 24. As shown in FIGS. 2 and 3, the lower locking piece 27 is in lowermost position, resting on a stop 33 on the back plate 15. A lug 34 extending downwardly from the lower locking piece 27 is transversely apertured to receive a shaft 35 secured between the lower ends of a pair of links 36, of which the lower parts are upright, the upper parts including upwardly to the rear. The upper ends of the links are connected by a shaft 37, on which are pivoted the front ends of a pair of short levers 38 secured at opposite sides of one end of a handle 39. Between the rear ends of the short levers 38 there is pivoted a head 40 of a spindle 41 extending upwardly from upper locking piece 26 through the flange 16 of back plate 15 and having an adjustment nut 42 engaged thereon above the flange. A helical compression spring 43 on the spindle between the upper locking piece and the flange 16 urges the upper locking piece 26 to lowered position, as shown particularly in FIG. 3, covering the upper part of the passage 25 through the back plate 15. However, when the coupling shaft 19 is forced rearwardly relative to the body 10, the pointed end of the rear-end piece 24 will force the upper locking piece 26 upwardly against the action of the spring 43 until, the rear-end piece 24 having moved to rearmost position, the upper locking piece is free to descend, retaining the rear-end piece behind the said locking piece.

The lower locking piece 27 may be raised to operative position, closely engaging the lower part of the coupling shaft 19 in front of the rear-end piece 24, by swinging the handle 39 forwardly and down to lift the links 36. By inserting a pin (not shown) through an apertured lug 44 on the handle 39 and through an apertured arm 45 secured to and extending upwardly from the body top plate 12, the lock may be held engaged.

A swinging stop 46 is pivoted about a longitudinal axis to an upper front corner of the body 10 for a purpose hereinafter described.

In use, when a towing vehicle is to be backed to be coupled to the caravan, the lock is disengaged to free the coupling shaft 19. This is done by disconnecting the apertured lug 44 of the handle 39 from the apertured arm 45 and swinging the handle upwardly and rearwardly to cause the links 36 to lower the lower locking piece 27; and by swinging the handle 39 further rearwardly to cause the spindle 41 to be lifted by the short levers 38 to raise the upper locking piece 26. The coupling socket assembly 20 may then be drawn forwardly, the rear-end piece 24 of the coupling shaft 19 passing freely through the passage 25 into the body 10. The coupling socket assembly 20 may be advanced, retracted, raised, lowered, turned about the axis of the shaft 19, or swung to one side or the other, as may be required to facilitate its engagement with the coupling ball on the towing vehicle. When this is done, the towing vehicle may be backed, causing the coupling shaft 19 to be moved rearwardly through the ball 18 and the body 10 until its rear-end piece 24 passes through the passage 25 of the rear plate 15 and is engaged automatically by the upper locking piece 26, the spring 21 on the coupling shaft 19 being somewhat compressed. The handle 39 is then swung down to the body 10, to lift the lower locking piece 27 to operative position, the handle then being secured in this position as before described.

The caravan may then be towed away in usual manner. If the towing vehicle, while travelling, is braked, so that the caravan tends by inertia to exert compression on the shaft 19, the spring 21 is further compressed and the rear-end piece 24 co-acts with the caravan brake lever pivoted between the lugs 32 in known manner to cause the caravan brakes to be applied.

When the caravan is to be backed by the towing vehicle, the swinging stop 46 is swung from inoperative position, as shown in FIG. 1, to operative position overlying the rear part of the curved flange 22 and close to the transverse rib 23, to prevent the caravan brake from being applied by compression applied to the shaft 19 by the reversing vehicle.

What I claim is:
1. A coupling for caravans and trailers including:
   a hollow body adapted to be mounted on a tow bar of a caravan or trailer,
   a bearing mounted for oscillation in the front of the body,
   a shaft slidable through the bearing to extended and retracted positions, the front of the shaft being movable laterally and vertically when the shaft is in extended position,
   a coupling socket on the front of the shaft,
   a rear-end piece on the rear of the shaft, limiting the extension of the shaft through the bearing,
   a lock at the rear end of the body, engageable with the rear-end piece,
   said lock comprising a spring-loaded first locking piece automatically engageable with the rear-end piece when the shaft is retracted, a second locking piece, and a handle connected to the first and second locking pieces and adapted, when moved to operative position, to move the second locking piece into engagement with the rear-end piece, and when moved to inoperative position to move the first and second locking pieces out of engagement with the rear-end piece, and
   guides in the body directing the rear-end piece, when the shaft is retracted, to the lock.

2. A coupling apparatus for caravans and trailers including:
   a hollow body adapted to be mounted on a tow bar of a caravan or trailer,
   a bearing mounted for oscillation in the front of said body,
   a shaft slidable through said bearing to extended and retracted positions, the front of said shaft being movable laterally and vertically when said shaft is in said extended position,
   coupling means on the front of said shaft for coupling said apparatus to a vehicle,
   a rear-end piece on the rear portion of said shaft for limiting the extension of said shaft through said bearing, and
   lock means releasably engageable with said rear-end piece of said shaft and mounted at the rear portion of said body, said lock means comprising a first locking member which is resiliently biased so as to automatically engage said rear-end piece when said shaft is retracted, a second locking member opposed to said first locking member, and operating means connected to said first and second locking members which, when moved to a first position, will move said second locking member into engagement with said rear-end piece thereby locking said shaft, and which, when moved to a second position, will move both said first and second locking members out of engagement with said rear-end piece to free said shaft.

* * * * *